United States Patent
Brunn et al.

(10) Patent No.: US 11,906,956 B2
(45) Date of Patent: Feb. 20, 2024

(54) MONITORING DEVICE AND MONITORING METHOD FOR DETECTING A DIAGNOSTIC STATE

(71) Applicant: Prüftechnik Dieter Busch GmbH, Ismaning (DE)

(72) Inventors: Dietrich Brunn, Unterföhring (DE); Jan Germer, Munich (DE)

(73) Assignee: Prüftechnik Dieter Busch GmbH, Ismaning (DE)

( * ) Notice: Subject to any disclaimer, the term of this patent is extended or adjusted under 35 U.S.C. 154(b) by 0 days.

(21) Appl. No.: 17/877,645

(22) Filed: Jul. 29, 2022

(65) Prior Publication Data

US 2023/0052644 A1   Feb. 16, 2023

(30) Foreign Application Priority Data

Aug. 2, 2021 (DE) .......................... 102021119985.9

(51) Int. Cl.
G05B 23/02 (2006.01)
G05B 19/418 (2006.01)

(52) U.S. Cl.
CPC ..... G05B 23/0221 (2013.01); G05B 19/4183 (2013.01)

(58) Field of Classification Search
CPC .. G05B 23/0221; G05B 19/4183; G01H 1/00; G01H 1/003
See application file for complete search history.

(56) References Cited

U.S. PATENT DOCUMENTS 7,039,557 B2   5/2006 Mayer et al.
9,977,422 B2   5/2018 Steele et al.
(Continued)

FOREIGN PATENT DOCUMENTS

DE      10144076 A1    3/2003
DE   102015009681 A1   1/2016
(Continued)

OTHER PUBLICATIONS

European Search Report, dated Dec. 21, 2022, for European Patent Application No. 22188114.7. (20 pages).
(Continued)

*Primary Examiner* — Manuel A Rivera Vargas
(74) *Attorney, Agent, or Firm* — Seed IP Law Group LLP

(57) ABSTRACT

A monitoring device for detecting a diagnostic state of an industrial machine on the basis of vibrations associated with the industrial machine, includes at least one measurement transducer for detecting at least one first signal characterizing the vibration of the industrial machine in a time period and for detecting at least one second signal characterizing the vibration of the industrial machine in the same time period, wherein the at least one measurement transducer has at least one signal processor for evaluating the at least first signal as a first characteristic value and for evaluating the at least second signal as a second characteristic value and wherein the at least one first characteristic value and the at least one second characteristic value form a characteristic value tuple, further having a storage unit, in which different diagnostic states describing the state of the industrial machine are saved, wherein the diagnostic states are determined as a function of the characteristic value tuple, and a predefined scalar range is saved with predetermined different fixed scalar values, which define respectively an existing limit potential, wherein a respective limit potential characterizes a change in the diagnostic state, and wherein between adjacent limit potentials a diagnostic partition is formed and wherein different scalar values from the scalar range are assigned to the different diagnostic partitions and wherein different respective diagnostic partitions represent different diagnostic states of the industrial machine, and wherein the monitoring device has at least one interpolation function for mapping the characteristic value tuple on a common, unique, (Continued)

time-dependent scalar value in the predefined scalar range, so that by way of the time-dependent scalar value a time monitoring of the diagnostic state of the industrial machine is achieved.

20 Claims, 6 Drawing Sheets

(56) References Cited

U.S. PATENT DOCUMENTS

| | | | |
|---|---|---|---|
| 11,054,337 B2 | 7/2021 | Knaup | |
| 2012/0041695 A1* | 2/2012 | Baldwin | G01H 1/003 702/56 |
| 2016/0305844 A1* | 10/2016 | Ochsenfeld | G01M 7/00 |
| 2017/0315516 A1 | 11/2017 | Kozionov et al. | |
| 2019/0210176 A1 | 7/2019 | Yamamoto | |
| 2020/0352099 A1 | 11/2020 | Meier et al. | |

FOREIGN PATENT DOCUMENTS

| | | |
|---|---|---|
| DE | 102016105877 A1 | 10/2017 |
| DE | 102017124281 A1 | 2/2019 |
| FR | 1556729 A | 2/1969 |

OTHER PUBLICATIONS

German Search Report, dated May 2, 2022, for German Patent Application No. 102021119985.9. (47 pages) (with Machine Translation).

International Standard, "Condition monitoring and diagnostics of machines—Vibration condition monitoring; Part 1: General procedures," Reference No. ISO 13373-1:2002(E), Feb. 15, 2002. (60 pages).

International Standard, "Condition monitoring and diagnostics of machines—Vibration condition monitoring; Part 2: Processing, analysis and presentation of vibration data," Reference No. ISO 13373-2:2016(E), Jan. 15, 2016. (44 pages).

International Standard, "Condition monitoring and diagnostics of machines—Vibration condition monitoring; Part 3: Guidelines for vibration diagnosis," Reference No. ISO 13373-3:2015(E), Sep. 9, 2015. (44 pages).

International Standard, "Mechanical vibration of rotating and reciprocating machinery—Requirements for instruments for measuring vibration severity," Reference No. ISO 2954:2012(E), Apr. 1, 2012. (20 pages).

Klein, "Vibration-diagnostic assessment of machines and systems," *Stahleisen GmbH* 2: 5-15, 25-67, 153-169, 177-179, 181-183, © 2000. (with Machine Translation) (192 pages).

\* cited by examiner $$F(t) = \begin{cases} 18 \log_{10}\left(\dfrac{a_p(t)}{a_{rms}(t)} \dfrac{1}{10^{4/9}}\right) & \text{for } 0 < a_{rms}(t) < a_{th}(t) \\ 18 \log_{10}\left(\dfrac{a_p(t)}{a_{th}} \dfrac{1}{10^{4/9}}\right) & \text{for } a_{rms}(t) \geq a_{th}(t) \end{cases}$$

MONITORING DEVICE AND MONITORING METHOD FOR DETECTING A DIAGNOSTIC STATE

BACKGROUND

Technical Field

The present disclosure relates to a monitoring device for detecting a diagnostic state of an industrial machine on the basis of vibrations associated with the industrial machine and to a monitoring method.

Description of the Related Art

The vibrations of industrial machines, such as rolling bearings, bearings, gears or generally rotating and non-rotating machines, are monitored in order to obtain a diagnostic state for the machine. The main aim is the early detection of worrying diagnostic states, so that corrective action can take place for example before the functioning of the machine is affected or permanent damage is done to the machine or there is a reduction in its service life.

For this purpose currently one-dimensional characteristic values with a continuous value range are used to monitor machines. These characteristic values are collected at regular intervals and considered as a time series. For these variables, depending on the type of machine, there are fixed or adaptable limit values, so that when the latter are exceeded a warning or an alarm is triggered. In addition, time series allow a simple differentiation to be made between trends and sporadic events without having any permanent effect.

However, there are machine states which can only be monitored by looking at two or more characteristic values at the same time. By looking at a single characteristic value the accurate and sufficient monitoring of such industrial machines or their components is not possible.

From WO 2017/167616 A1 a method and a device for performing a method for vibrational diagnostic monitoring and assessing the individual machine parts of a machine, preferably a rotating machine, using a frequency analyzer are known.

It is desirable to provide an improved monitoring device and an improved monitoring method.

BRIEF SUMMARY

Accordingly, one aspect of the present disclosure provides a monitoring device for detecting a diagnostic state of an industrial machine on the basis of vibrations associated with the industrial machine, comprising at least one measurement transducer for detecting at least one first signal characterizing the vibration of the industrial machine in a time period and for detecting at least one second signal characterizing the vibration of the industrial machine in the same time period, and wherein the at least one measurement transducer has at least one signal processor for evaluating the at least first signal as a first characteristic value and for evaluating the at least second signal as a second characteristic value and wherein the at least one first characteristic value and the at least one second characteristic value form a characteristic value tuple, further having a storage unit, in which different diagnostic states describing the state of the industrial machine are saved, wherein the diagnostic states are determined as a function of the characteristic value tuple, and a predefined scalar range is saved with predetermined different fixed scalar values, which define respectively an existing limit potential, wherein a respective limit potential characterizes a change in the diagnostic state, and wherein between adjacent limit potentials a diagnostic partition is formed, and wherein different scalar values from the scalar range are assigned to the different diagnostic partitions, and wherein different respective diagnostic partitions represent different diagnostic states of the industrial machine, and wherein the monitoring device has at least one interpolation function for mapping the characteristic value tuple onto a common unique, time-dependent scalar value in the predetermined scalar range, so that by way of the time-dependent scalar value a time monitoring of the diagnostic state of the industrial machine is achieved.

Industrial machines can be understood in one embodiment to be all industrial, vibration-generating machines. The latter can have rotating elements for example. Examples of the latter can include pumps, generators or wind turbines or components such as roller bearings. Further examples: electric motors, fans, (gas) turbines, etc.

Without being limited to this, measurement transducers can be contactless measurement transducers or seismic measurement transducers with suitable signal processing functions or piezoelectric vibration transducers.

In one embodiment, the measurement transducers can have as signals an acceleration, in particular a peak acceleration, a rotational frequency, an effective speed, a vibration displacement, a shaft displacement or generally an axial or radial displacement. In further embodiments an absolute vibrational movement or relative movement can be measured. Further signals can be temperature, sound or other physical variables.

A characteristic value can be for example the effective speed, for example in combination with the effective deflection or the acceleration. In one embodiment, characteristic values can be given as mean values and/or as effective values.

In one embodiment, the signal processing can be configured as a processor with a suitable signal evaluation function.

Furthermore, in one embodiment, the monitoring device can be configured to record signals continually. In another embodiment, the recording can be periodic or sporadic.

For representing the characteristic value tuple on a common, unique, time-dependent scalar value in the predefined scalar range by at least one interpolation function, the monitoring device has usual computing modules/processors or similar hardware. The monitoring device can map the characteristic value tuple to a common unique time-dependent scalar value in the predefined scalar range by way of the computing modules/processors and the at least one interpolation function executed there-on.

Computing modules are for example conventional computers with a CPU, storage unit, processor etc.

In one embodiment, diagnostic states are ordered for example with respect to their criticality, a false measurement, a good state or a warning state or an alarm state. Here, a good state is a non-critical state and an alarm state is a highly critical state. A false measurement means no or very few conclusions can be drawn.

By way of the present disclosure, the temporal development of machine states can be monitored, which can only be detected or better detected by simultaneously looking at least two or more characteristic values. In this way, a temporal diagnostic state can be detected. This prevents characteristic values from being combined which are strongly offset in time for example. By mapping the measured signals to a scalar value, the temporal development of the diagnostic state can be represented.

In one embodiment, adjacent diagnostic partitions represent consecutive diagnostic states of the industrial machine with respect to criticality.

In one embodiment, the consecutive diagnostic states are formed at least in ascending order as a false measurement, a good state, a warning state and an alarm state. In a further embodiment the values of the time-dependent scalar values can increase with respect to the criticality of the sequence of states.

In a further embodiment only two different diagnostic partitions are adjacent to one another. This prevents a scalar value from being adjacent to more than two diagnostic partitions.

In one embodiment, the different consecutive diagnostic states are defined in the storage unit as a function of the characteristic value tuple.

In a further embodiment the monitoring device can be further configured, in the presence of at least one characteristic value tuple, which corresponds to a change between the diagnostic states, to map the characteristic value tuple to the corresponding scalar value unique to the limit potential associated with the change of diagnostic state. This means that the interpolation function can be represented as a simple mapping function. The scalar value in this embodiment is the scalar value of the associated limit potential.

In one embodiment, several potentials with intermediate sub-partitions are assigned to a respective diagnostic partition, wherein a respective potential is assigned uniquely to a predetermined scalar value and wherein the monitoring device is configured to map the characteristic value tuple to the corresponding scalar value uniquely associated with the change of potential in the presence of at least one characteristic value tuple, which indicates a change between the sub-partitions.

In a further embodiment the monitoring device has a plurality of interpolation functions and is also configured to select the interpolation function as a function of the characteristic value tuple. In particular, the interpolation function can be selected as a function of existing diagnostic partitions and existing sub-partitions.

In one embodiment, the interpolation functions are associated with the different diagnostic partitions, wherein the monitoring device is further designed to map, in the presence of at least one characteristic value tuple, which is within one of the diagnostic partitions, the characteristic value tuple to the unique scalar value by the interpolation function associated with the diagnostic partition.

Also, in one embodiment, the interpolation functions can be assigned to the different sub-partitions, wherein the monitoring device is further configured to map in the presence of at least one characteristic value tuple, which lies within one of the sub-partitions, the characteristic value tuple to the unique scalar value by the interpolation function assigned to the sub-partition.

Furthermore, in one embodiment, the interpolation function within the sub-partitions can have no extremes. In another embodiment, the characteristic value tuple, which lies within one of the sub-partitions, can always be mapped to the same scalar value.

In one embodiment, an aggregating unit is provided for aggregating the first and second characteristic values determined during the predefined time period as a characteristic value tuple and coupling the characteristic value tuple to the time period. The aggregating unit can wait for example until each measurement transducer has delivered a signal value and the corresponding characteristic value and then couple these aggregated as a characteristic value tuple provided with the time period as a time stamp.

Also only one measurement transducer can supply a plurality of signals and characteristic values and the aggregating unit can be configured to couple these as a characteristic value tuple; provided with the time period as a time stamp. Here for example, depending on the characteristic value the time period between the signals and the calculated characteristic values can be significantly different, for example due to different settling times and different lengths of recording intervals.

In one embodiment, the at least one measurement transducer is configured to periodically generate at least a first signal and a second signal at consecutive time periods.

In one embodiment, a trigger unit can be provided which triggers the at least one measurement transducer, in order to generate at least the first signal and the at least second signal in consecutive time periods. The trigger unit thus triggers for example the generation of signals to the existing one or more different measurement transducers.

In a further embodiment, the monitoring device is configured to output the time-dependent scalar values generated in consecutive time periods as a time curve with the at least limit potentials. This can be performed for example in an embodiment as a scatterplot diagram.

In one embodiment, the at least one measurement transducer is a piezoelectric vibration transducer. In one embodiment, this is able to measure accelerations, typically in the order of 0.1 m/s$^2$ to 1000 m/s$^2$, in a frequency range of 0.1 Hz to 25 kHz.

In one embodiment, a plurality of measurement transducers are each provided with a signal processor for detecting at least a first and second signal characterizing the vibration of the industrial machine.

In one embodiment, the at least one measurement transducer is configured for detecting a first and second signal characterizing the vibration of the industrial machine and for detecting further signals characterizing the vibration of the industrial machine and for evaluating into a plurality of characteristic values.

Furthermore, a monitoring method is provided for detecting a diagnostic state of an industrial machine on the basis of vibrations associated with the industrial machine, wherein at least one measurement transducer is provided for detecting at least one first signal characterizing the vibration of the industrial machine in a time period and for detecting at least one second signal characterizing the vibration of the industrial machine in the same time period and wherein the at least one measurement transducer has at least one signal processor for evaluating the at least first signal as a first characteristic value and for evaluating the at least second signal as a second characteristic value, and wherein the at least one first characteristic value and the at least one second characteristic value form a characteristic value tuple, wherein furthermore a storage unit is provided, in which different diagnostic states describing the state of the industrial machine are saved, wherein the diagnostic states are determined as a function of the characteristic value tuple, and a predefined scalar range is saved with predetermined different fixed scalar values, which define respectively an existing limit potential, wherein a respective limit potential characterizes a change in the diagnostic state, and wherein between adjacent limit potentials a diagnostic partition is formed, and wherein different scalar values from the scalar range are assigned to the different diagnostic partitions, and wherein different respective diagnostic partitions represent different diagnostic states of the industrial machine, and wherein at least one interpolation function is provided for mapping the characteristic value tuple onto a common unique, time-dependent scalar value in the predetermined scalar range, so that by way of the time-dependent scalar value a time monitoring of the diagnostic state of the industrial machine is achieved.

The further embodiments of the monitoring device may be also be transferred to the monitoring method.

In particular, the monitoring method may be performed on the monitoring device as described above or its further embodiments.

BRIEF DESCRIPTION OF THE SEVERAL VIEWS OF THE DRAWINGS

Further features, properties and advantages of the present disclosure are given in the following description with reference to the accompanying Figures. In schematic form.

DETAILED DESCRIPTION

Figure 1:
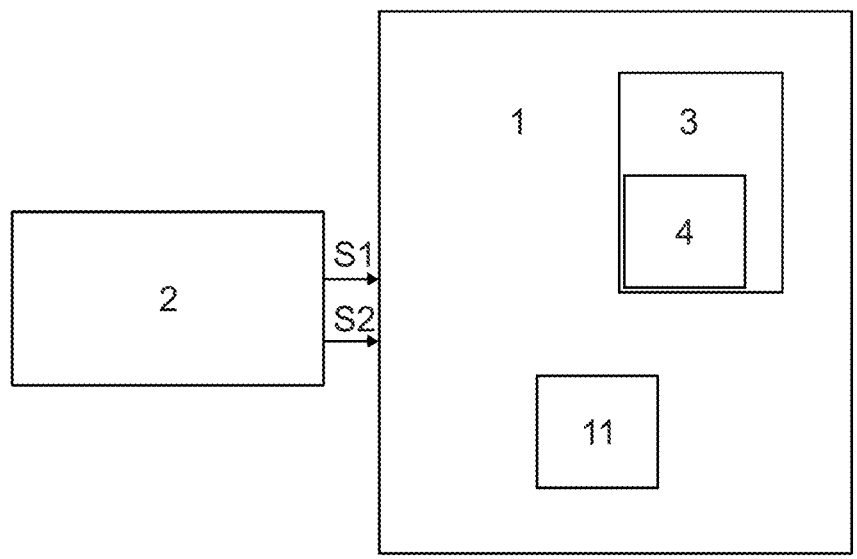
FIG. 1 shows a monitoring device in a first embodiment.

FIG. 1 shows a monitoring device 1 for detecting a diagnostic state of an industrial machine 2 on the basis of vibrations associated with the industrial machine 2 by at least one measurement transducer 3 in a first embodiment.

The monitoring device 1 can be arranged in one embodiment as a fixed stationary device on the machine 2. In another embodiment the monitoring device 1 can be installed semi-permanently. In a further embodiment the monitoring device 1 is configured as a portable device for setting up and detecting vibrations.

In one embodiment, industrial machines 2 can be understood as any vibration generating industrial machines, for example machines with rotating elements. Examples of such machines include pumps, generators or wind turbines, industrial plants or roller bearings.

In general, the monitoring device 1 can be applied to all types of industrial machines 2, which allow the detection of a diagnostic state based on the vibrations generated by the industrial machine 2.

Without being limited to this, measurement transducers 3 can be contactless measurement transducers or seismic measurement transducers with suitable signal processing functions or piezoelectric vibration transducers, which are capable for example of measuring accelerations typically in the order of 0.1 m/s² to 1000 m/s² in a frequency range of 0.1 Hz to 25 kHz.

The measurement transducers 3 can be accelerometers, speed transducers, contactless probes or a combination thereof.

Other configurations are also possible.

Figure 2:
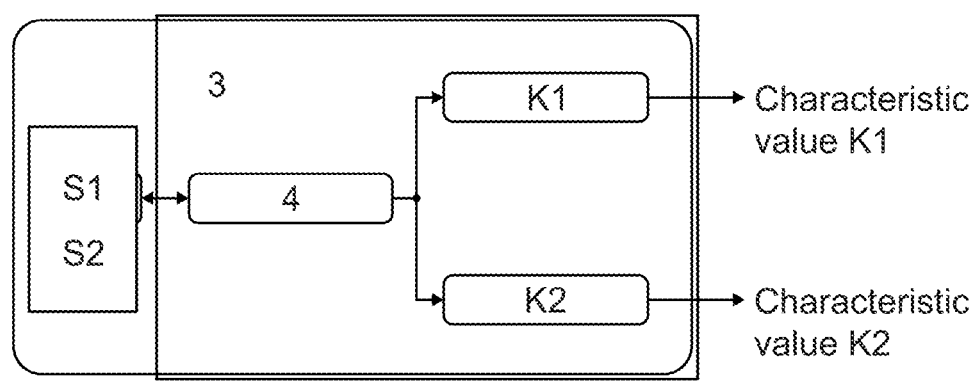
FIG. 2 shows an example of a measurement transducer in a first embodiment.

FIG. 2 shows a measurement transducer 3 for detecting at least a first signal S1 and second signal S2 characterizing the vibration in a predetermined time period, by which a time stamp is formed, of the industrial machine 2. In a further embodiment further signals can also be detected by the measurement transducer 3. The measurement transducer 3 has a signal processor 4 for evaluating the at least first signal S1 as a first characteristic value K1 and the at least second signal S2 as a second characteristic value K2. Typical characteristic values can be mean values and the effective value of the acceleration as a root mean square, maximum, zero-peak-characteristic values (0-to-peak, amplitudes) for the given time period. The effective value of acceleration indicates which power has a vibration signal and is obtained by bandpass filtering (e.g. in the range of 10 Hz-1 kHz).

A zero-peak-characteristic value can be understood as the maximum of the magnitude of a detected signal over a predefined measurement period (time period). This characteristic value can be used as a measure for the peak content of a signal.

Furthermore, also more than two characteristic values can be provided. The combination of two or more characteristic values allows a more reliable assessment compared to the use of a single characteristic value, in particular for machine states which can only be monitored by looking at two or more characteristic values at the same time.

The detected characteristic values K1, K2 can be represented as time-dependent characteristic value tuples.

The monitoring device 1 further comprises a storage unit 11.

In one embodiment, the storage unit 11 can also be integrated into the measurement transducer 3.

In the storage unit 11 different, consecutive diagnostic states describing the state of the industrial machine 2 are saved.

Diagnostic states can be, in one embodiment for example, a false measurement, a good state, a warning state, and an alarm state.

Figure 3:
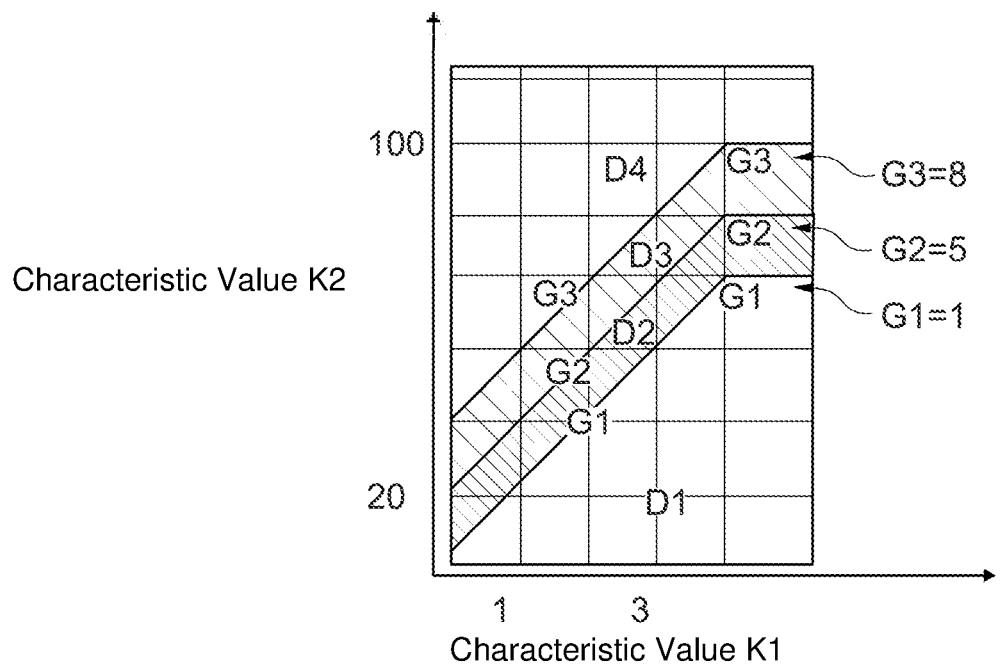
FIG. 3 shows schematically the diagnostic partition as a function of a characteristic value tuple.

Furthermore, the storage unit 11 has predefined different scalar values, which define respectively at least available limit potentials, in this embodiment G1, G2, G3 (FIG. 3), wherein a limit potential G1, G2, G3 characterizes a change of the diagnostic state, wherein between adjacent limit potentials G1, . . . , G3 a diagnostic partition is formed, in this embodiment as diagnostic partitions D1, . . . , D4 (FIG. 3).

It should be noted that more than three limit potentials (n-limit potentials, with n natural number) and more than four diagnostic partitions (m-diagnostic partitions with m natural number) can be provided.

In this embodiment the diagnostic partitions D1,D2,D3, D4 (FIG. 7) are assigned to the diagnostic states: false measurement as D1, good state as D2, warning state as D3 and alarm state as D4. Furthermore, the limit potentials, here G1, G2,G3, are each assigned a scalar value, here for example the scalar values 1, 5 and 8. It should be noted here that these are simplified examples of the present disclosure and its embodiments.

FIG. 3 shows schematically the diagnostic partitions D1,D2,D3,D4 as a function of the first characteristic value K1 and a second characteristic value K2 and the limit potentials G1,G2,G3, which can also be considered as contour lines for example.

Every combination of characteristic values K1,K2, i.e. to each characteristic value tuple, is thus assigned uniquely to one of the four diagnostic partitions D1,D2,D3,D4 and thus four discrete diagnostic states or one of the limit potentials G1,G2,G3.

Here a characteristic value tuple can comprise at least two characteristic values K1,K2 or also a plurality of characteristic value tuples, which can be formed by one or more measurement transducers $3a, \ldots, 3n$.

Figure 4:
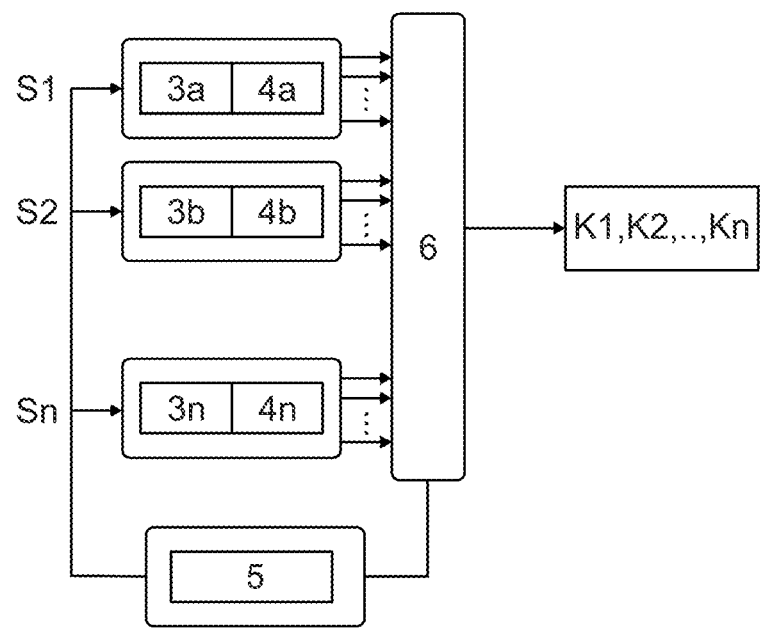
FIG. 4 shows an aggregating unit in a first embodiment.

FIG. 4 shows schematically a plurality of measurement transducers $3a, \ldots, 3n$. The latter can be in the form of vibration transducers or other sensors. Each of these measurement transducers $3a, \ldots, 3n$ detects one of the signals $S1, \ldots, Sn$ characterizing the vibration of the industrial machine 2, which are converted into characteristic values $K1, \ldots, Kn$ by way of a corresponding signal processor $4a, \ldots 4n$. In another embodiment, the individual measurement transducers can also detect a plurality of signals.

In this embodiment, a trigger unit 5 can be provided, which triggers the measurement transducers $3a, \ldots 3n$ to detect the signals $S1, \ldots, Sn$ in consecutive time periods.

The trigger unit 5 thus triggers for example the generation of signals $S1, \ldots, Sn$ in the existing measurement transducer $3a, \ldots, 3n$. The trigger signal thus activates the existing measurement transducers $3a, \ldots, 3n$.

In other embodiments, the measurement transducer(s) $3a, \ldots 3n$ can be designed to detect signals periodically or continuously.

Furthermore, the embodiment in FIG. 4 has an aggregating unit 6, for aggregating the characteristic values $K1, \ldots, Kn$ determined during the predefined time periods as a characteristic value tuple. The aggregating unit 6 waits until each measurement transducer $3a, \ldots 3n$ or each signal processor $4a, \ldots, 4n$ has delivered a characteristic value $K1, \ldots, Kn$, and then passes these on aggregated as a characteristic value tuple. Here, depending on the characteristic value $K1, \ldots, Kn$ the time period between triggering and the finished characteristic value $K1, \ldots, Kn$ can be very different, for example due to different settling periods and the different lengths of a required recording interval.

In a further embodiment, the characteristic value tuple is uniquely mapped to a scalar value by one or more interpolation functions.

For mapping the characteristic value tuple to a common unique, time-dependent scalar value in the predefined scalar range by at least one interpolation function, the monitoring device 1 has, as usual, a computing module/processor or similar hardware.

Figure 5:
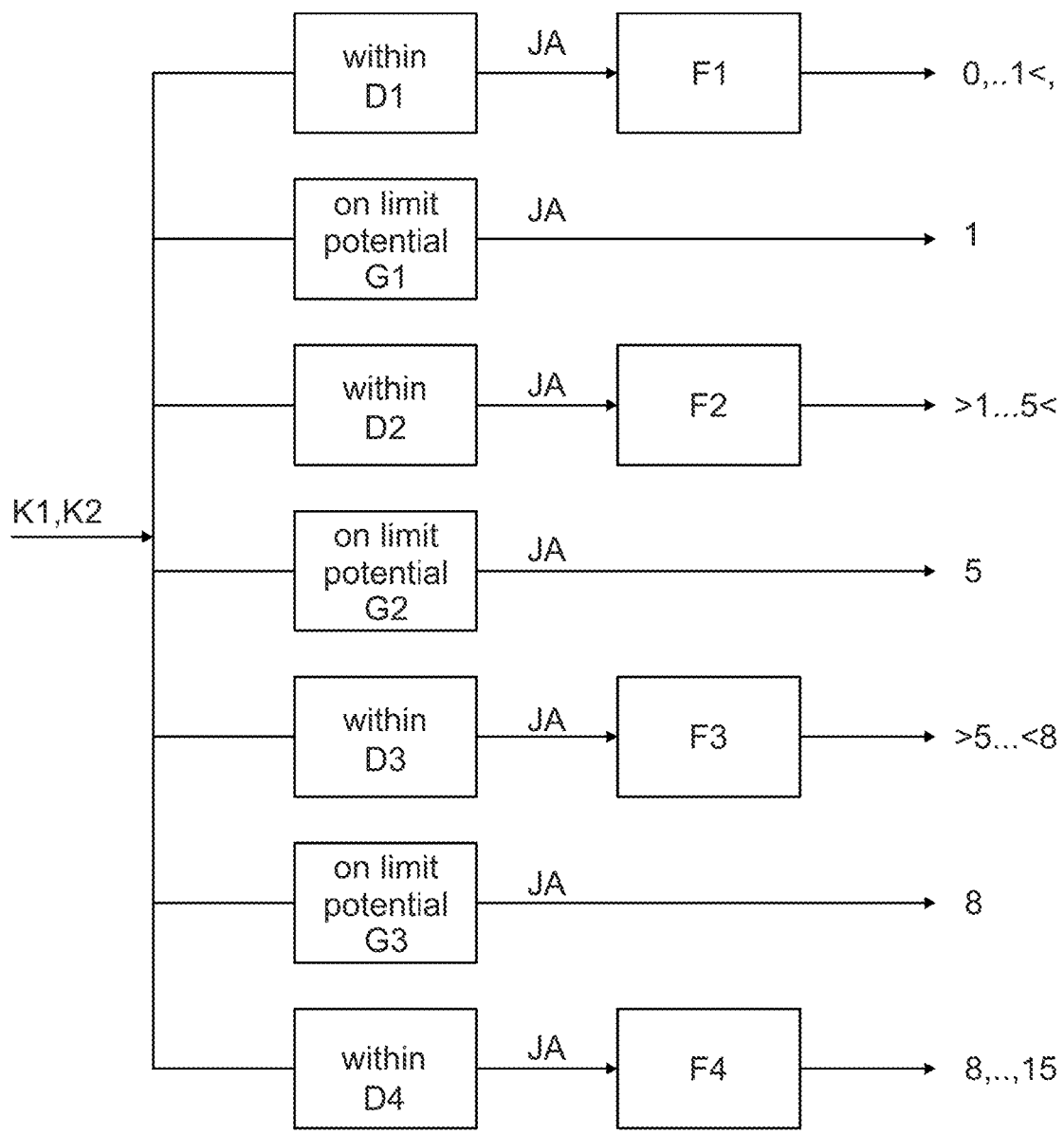
FIG. 5 shows schematically a mapping of two characteristic values.

FIG. 5 shows schematically a mapping of the at least two characteristic values K1 and K2 to a unique, time-dependent scalar value by interpolation functions.

In one embodiment, different interpolation functions F1,F2,F3,F4 are provided for the different diagnostic partitions D1,D2,D3,D4, as shown for example in FIG. 3.

Firstly, it is checked in which diagnostic partition D1,D2, D3,D4 the characteristic value tuple K1,K2 is located or whether it is located on one of the limit potentials G1,G2, G3. For each diagnostic partition D1,D2,D3, D4 an interpolation function F1,F2,F3,F4, which maps the characteristic values K1,K2 to a scalar value is used. In one embodiment, these interpolation functions F1,F2,F3,F4 are continuous and smooth. Furthermore, in one embodiment, within the diagnostic partition D1,D2,D3,D4 the interpolation functions F1,F2,F3,F4 either have no extremes or map all characteristic values K1,K2 on the same scalar value. In other embodiments, for example for a plurality of diagnostic partitions D1,D2,D3,D4, the same interpolation function can be used.

In this example, the characteristic value tuple K1,K2 if present in the diagnostic partition D1 is mapped to a scalar value between 0 and 1 by way of the interpolation function F1. Here the range 0 and 1 is selected at random and is used only for illustration.

If the characteristic value tuple lies on the limit potential G1, the characteristic value tuple K1,K2 is mapped directly to the scalar 1. Here the scalar value 1 is chosen at random.

If the characteristic value tuple K1,K2 lies in the diagnostic partition D2, the characteristic value tuple K1,K2 is mapped to a scalar value between 1 and 5 by way of the interpolation function F2. Here the range 1 and 5 is selected at random and is used only for illustration.

If the characteristic value tuple K1,K2 lies on the limit potential G2, the characteristic value tuple K1,K2 is mapped directly to the scalar value 5. The value 5 is chosen here at random.

If the characteristic value tuple K1,K2 lies in the diagnostic partition D3, the characteristic value tuple K1,K2 is mapped to a scalar value between 5 and 8 by way of the interpolation function F3. Here the range 5 and 8 is selected at random and is used only for illustration.

If the characteristic value tuple K1,K2 lies on the limit potential G3, the characteristic value tuple K1,K2 is mapped directly to the scalar value 8. The value 8 is chosen here at random.

If the characteristic value tuple K1,K2 lies in the diagnostic partition D4, the characteristic value tuple K1,K2 is mapped to a scalar value between 8 and 15 by way of the interpolation function F4. Here the range 8 and 15 is selected at random and is used only for illustration.

Thus the individual scalar values can give an approximate measure of the distance to the corresponding limit potentials G1,G2,G3.

Furthermore, also more than two characteristic values can be included.

The respective scalar values are linked to the time period as time stamps.

Figures 6, 7:
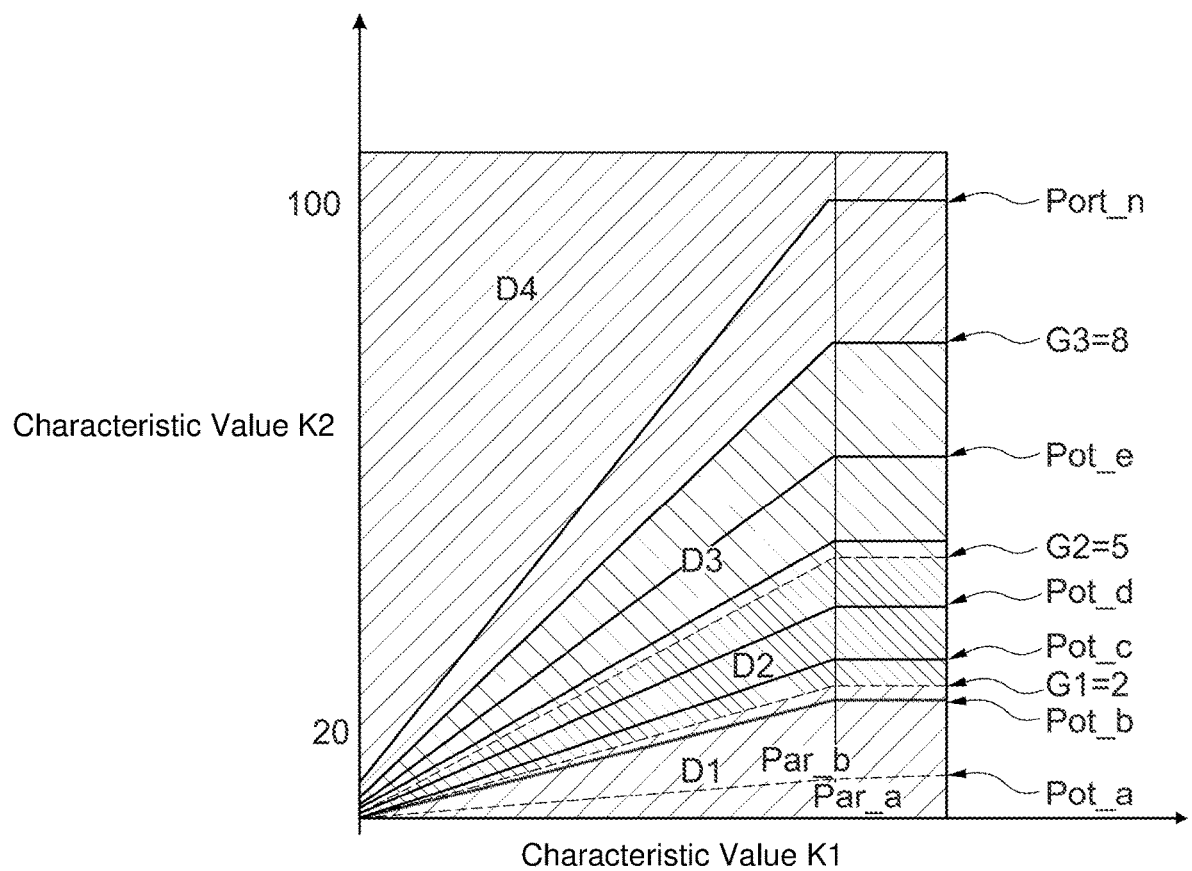
FIG. 6 shows schematically an interpolation function.
FIG. 7 shows a further configuration of a monitoring device.

FIG. 6 shows for the characteristic values K1=effective value of acceleration as a root mean square, and K2=zero-peak-characteristic value (0-to-peak) such an interpolation function F. Here the effective value of the acceleration indicates which power has a vibration signal and is obtained by bandpass-filtering (e.g. to 10 Hz-1 kHz), wherein a detailed explanation is not given. The two characteristic values effective value of acceleration, zero-peak-characteristic value can thus be represented simply as a time series and shown as a function of the limit potentials G1,G2,G3 for example.

There are only scalar values, which are assigned to one of the diagnostic partitions D1, . . . , D4 or a limit potential G1,G2,G3.

FIG. 7 shows a further configuration. Here a plurality of potentials Pot_a, Pot_b . . . , Pot_n with sub-partitions Part_a, . . . , Part_n in between are assigned to one of the diagnostic partitions D1,D2,D3,D4, wherein a predefined scalar value is uniquely assigned to each potential Pot_a, Pot_b . . . , Pot_n.

Here the sub-partitions Part_a, . . . , Part_n as well as the diagnostic partitions D1,D2,D3,D4 can be arranged so that only two sub-partitions Pot_a, Pot_b . . . , Pot_n or two diagnostic partitions D1,D2,D3,D4 are adjacent to one another. Furthermore, advantageously only diagnostic partitions D1,D2,D3,D4 of consecutive states can be adjacent to one another. This can also be transferred to the sub-partitions Part_a, . . . , Part_n.

In addition, each of the sub-partitions Part_a, . . . , Part_n can be assigned an interpolation function, or a plurality of sub-partitions Part_a, . . . , Part_n have a common interpolation function. The characteristic values K1,K2, which lie on a potential Pot_a, Pot_b . . . , Pot_n, can be mapped to the scalar value defined for these potentials Pot_a, Pot_b . . . , Pot_n, just like the characteristic values K1,K2, which lie on a limit potential G1, G2,G3, can be mapped to the scalar value defined therefor.

Figure 8:
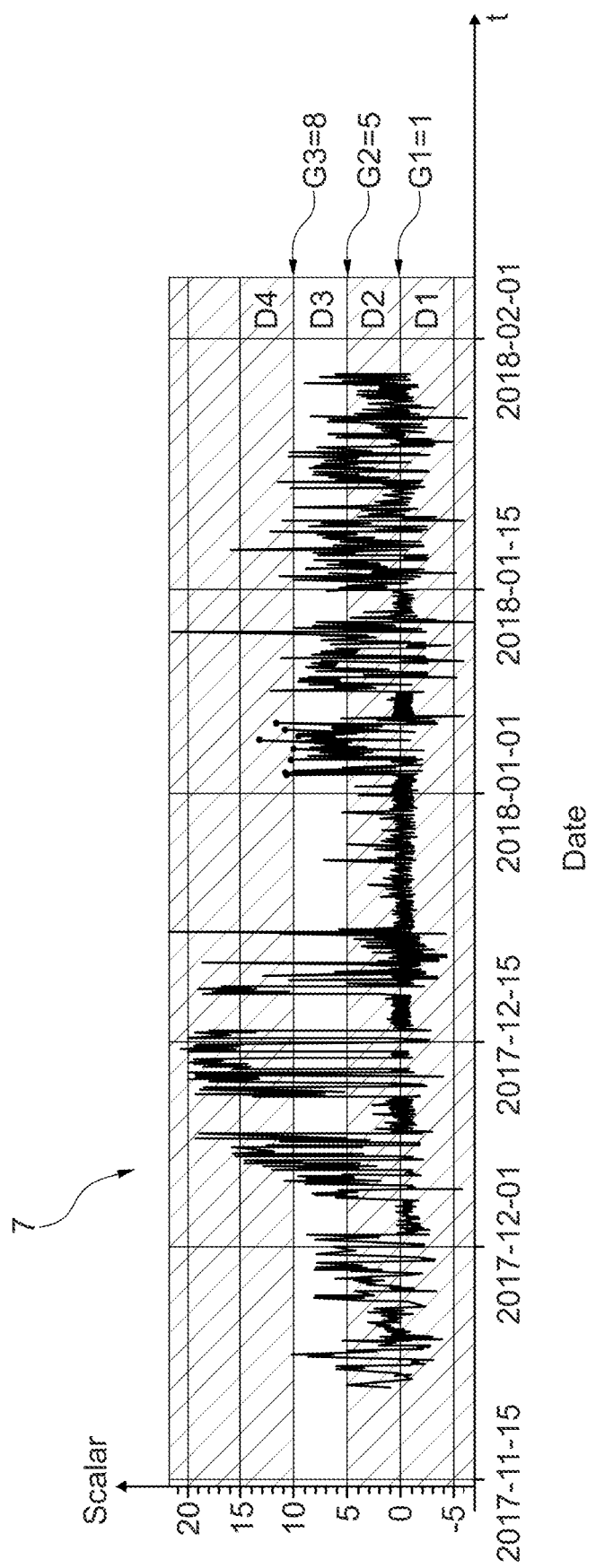
FIG. 8 shows two characteristic values as time-dependent scalar values in a diagram.

FIG. 8 shows as a diagram 7 the characteristic values K1,K2 as time-dependent scalar values as a function of the limit potentials G1,G2,G3 with the diagnostic partitions D1,D2,D3,D4, plotted over time t, wherein the diagnostic partitions D1,D2,D3,D4 in this example represent consecutive states, i.e. false measurement, good state, warning state and alarm state.

This enables a time-dependent monitoring of the at least two characteristic values K1,K2. The monitoring device 1 can also be used for a plurality of characteristic values K1, . . . , Kn.

The combination of a plurality of characteristic values enables a more reliable assessment compared to the use of a single characteristic value; in particular, vibrations of components can also be monitored which can only be described by several characteristic values.

By evaluating the time paths of the scalar values for example an estimate can be made as to when a bearing may fail.

Diagram 7 can be seen as a continuous mapping of the characteristic values to a scalar value which represents the time development of the diagnostic state of the industrial machine 2. Thus a scalar value is assigned to each location in the multi-dimensional diagram 7. This value can then be used for trending. Here when trending the rate at which the vibration values change over the operating time is examined.

Figure 9:
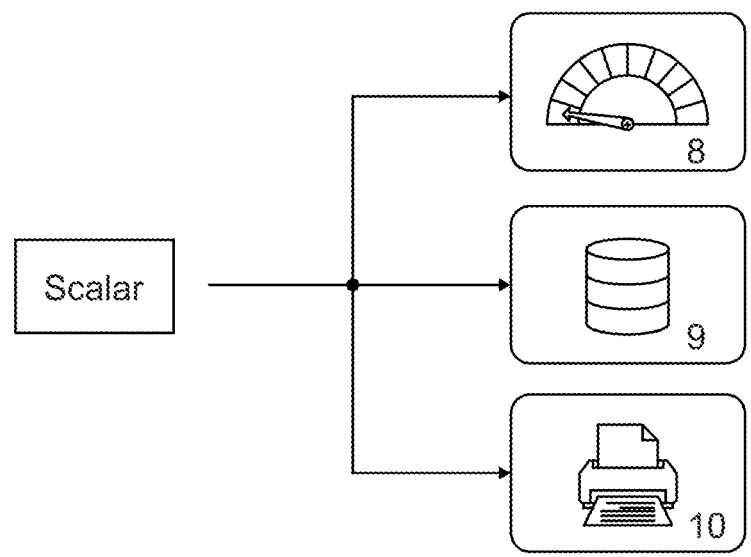
FIG. 9 shows possible applications of a determined scale.

FIG. 9 shows further possible applications of the scalar value determined in this way, which is formed by two or more characteristic values. Thus this can be entered into a signal device 8, which emits a warning in time and/or is stored in a database 9 or logging device 10 to enable long-term monitoring.

Figure 10:
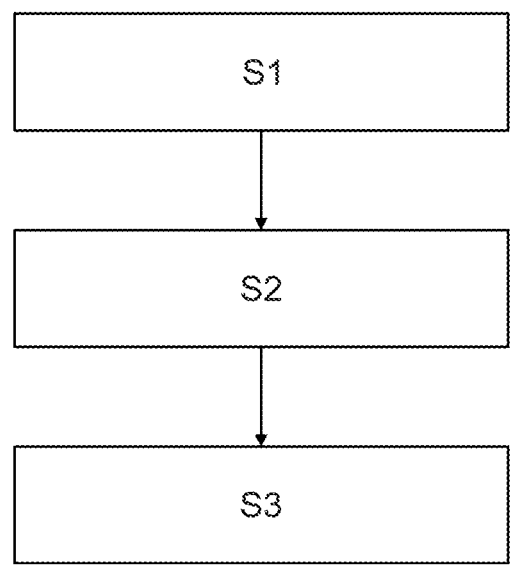
FIG. 10 shows schematically the monitoring method.

FIG. 10 shows schematically the monitoring method for detecting a diagnostic state of an industrial machine 2 on the basis of vibrations which are associated with the industrial machine 2.

In step S1 two or more signals S1, . . . , Sn are detected by one or more measurement transducers 3a, . . . 3n in a time period and in a second step S2 converted by a signal processor 4a, . . . 4n into two or more characteristic values K1, . . . , Kn.

Afterwards, these characteristic values K1, . . . Kn are mapped as characteristic value tuple in a step S3 by one or more interpolation functions to scalar values, so that a time-dependent monitoring of the diagnostic state of the industrial machine 2 is achieved by the time-dependent scalar value.

| REFERENCE SIGNS | |
|---|---|
| 1 | monitoring device |
| 2 | industrial machine |
| 3, 3a, . . . 3n | measurement transducer |
| 4, 4a, . . . , 4n | signal processor |
| 5 | trigger unit |
| 6 | aggregating unit |
| 7 | diagram |
| 8 | signal device |
| 9 | database |
| 10 | logging device |
| 11 | storage unit |
| S1, . . . , Sn | signals |
| K1, . . . , Kn | characteristic values |
| D1, . . . , D4 | diagnosis partition |
| F1, . . . , F4 | interpolation functions |
| G1, G2, G3 | limit potentials |
| Part_a,, Part_n | sub-partitions |
| Pot_a, . . . , Pot_n | potentials |

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A monitoring device for determining a diagnostic state of an industrial machine, comprising:
at least one measurement transducer for generating at least one first signal characterizing a vibration of the industrial machine in a time period and for generating at least one second signal characterizing the vibration of the industrial machine in the same time period,
wherein the at least one measurement transducer has at least one signal processor for evaluating the at least one first signal as a first characteristic value and for evaluating the at least one second signal as a second characteristic value, and
wherein the first characteristic value and the second characteristic value form a characteristic value tuple,
the monitoring device further comprising a storage unity in which different diagnostic states describing a state of the industrial machine are saved, wherein the different diagnostic states are determined as a function of the characteristic value tuple, and a predefined scalar range is saved with predetermined different fixed scalar values which define respectively an existing limit potential,
wherein a respective limit potential characterizes a change in the diagnostic state of the industrial machine,
wherein between adjacent limit potentials a diagnostic partition is formed, and wherein different scalar values from the predefined scalar range are assigned to different diagnostic partitions, and
wherein the different diagnostic partitions respectively represent the different diagnostic states of the industrial machine, and
wherein the monitoring device further comprises at least one interpolation function, the monitoring device being configured to use the at least one interpolation function to map the characteristic value tuple onto a common unique, time-dependent scalar value in the predefined scalar range, so that by way of the time-dependent scalar value a time-dependent monitoring of the diagnostic state of the industrial machine is achieved.

2. The monitoring device according to claim 1, wherein respective adjacent diagnostic partitions represent, with respect to criticality, consecutive diagnostic states of the industrial machine, and wherein the consecutive diagnostic states are formed at least in ascending order in a sequence of states including a false measurement, a good state, a warning state, and an alarm state.

3. The monitoring device according to claim 2, wherein a value of the time-dependent scalar value increases with respect to a criticality of the sequence of states.

4. The monitoring device according to claim 1, wherein the monitoring device is further configured, in the presence of at least one characteristic value tuple which corresponds to a change between the diagnostic states, to map the at least one characteristic value tuple to a corresponding limit potential unique to the change between the diagnostic states.

5. The monitoring device according to claim 4, wherein a plurality of potentials with intermediate sub-partitions are assigned to a respective diagnostic partition, wherein a potential is uniquely assigned to a predetermined scalar value and wherein the monitoring device is configured to map, in the presence of at least one characteristic value tuple which indicates a change between the sub-partitions, the at least one characteristic value tuple to the corresponding scalar value uniquely associated with the change between the sub-partitions.

6. The monitoring device according to claim 1, wherein the monitoring device has a plurality of interpolation functions and is further configured to select the at least one interpolation function as a function of the characteristic value tuple.

7. The monitoring device according to claim 6, wherein the interpolation functions are assigned to the different diagnostic partitions, wherein the monitoring device is further configured to map, in the presence of at least one characteristic value tuple which lies within one diagnostic partition of the diagnostic partitions, the at least one characteristic value tuple to a unique scalar value by the interpolation function assigned to the one diagnostic partition.

8. The monitoring device according to claim 7, wherein a respective diagnostic partition is assigned a plurality of potentials with sub-partitions in between, wherein the interpolation functions are assigned to different sub-partitions, wherein the monitoring device is further configured, in the presence of at least one characteristic value tuple which lies within one sub-partition of the sub-partitions, to map the at least one characteristic value tuple by the interpolation function assigned to the sub-partition to the unique scalar value.

9. The monitoring device according to claim 1, wherein an aggregating unit is provided for aggregating first characteristic values and second characteristic values determined during the time period as characteristic value tuple and coupling the characteristic value tuple to the time period.

10. The monitoring device according to claim 1, wherein the at least one measurement transducer is configured to generate periodically the at least one first signal and the at least one second signal in consecutive time periods.

11. The monitoring device according to claim 10, wherein a trigger unit is provided, which triggers the at least one measurement transducer, in order to generate the at least one first signal and the at least one second signal in the consecutive time periods.

12. The monitoring device according to claim 1, wherein the at least one measurement transducer is a piezoelectric vibration transducer.

13. The monitoring device according to claim 1, wherein a plurality of measurement transducers are provided respectively with a signal processor for detecting the at least one first signal and the at least one second signal characterizing the vibration of the industrial machine.

14. The monitoring device according to claim 1, wherein the at least one measurement transducer is configured to generate the at least one first signal and the at least one second signal characterizing the vibration of the industrial machine and to generate further signals characterizing vibrations of the industrial machine and evaluate as a plurality of characteristic values.

15. A monitoring method for determining a diagnostic state of an industrial machine, comprising:
provdiing at least one measurement transducer for generating at least one first signal characterizing a vibration of the industrial machine in a time period and for generating at least one second signal characterizing the vibration of the industrial machine in the same time period,
providing the at least one measurement transducer with at least one signal processor for evaluating the at least one first signal as a first characteristic value and for evaluating the at least one second signal as a second characteristic value, wherein the first characteristic value and the second characteristic value form a characteristic value tuple,
providing a storage unit in which different diagnostic states describing a state of the industrial machine are saved, wherein the different diagnostic states are determined as a function of the characteristic value tuple, and a predefined scalar range is saved with predefined different fixed scalar values which define respectively an existing limit potential,
wherein a respective limit potential characterizes a change in the diagnostic state of the industrial machine,
wherein between adjacent limit potentials a diagnostic partition is formed, and wherein different scalar values from the predefined scalar range are assigned to different diagnostic partitions,
wherein the different diagnostic partitions respectively represent different diagnostic states of the industrial machine, and
by way of at least one interpolation function, mapping the characteristic value tuple onto a common, unique, time-dependent scalar value in the predefined scalar range, so that by way of the time-dependent scalar value a time-dependent monitoring of the diagnostic state of the industrial machine is achieved.

16. The monitoring method according to claim 15, wherein the respective adjacent diagnostic partitions represent, with respect to criticality, consecutive diagnostic states of the industrial machine and wherein the consecutive diagnostic states are formed at least in ascending order as a false measurement, a good state, a warning state, and an alarm state.

17. The monitoring method according to claim 15, wherein in the presence of at least one characteristic value tuple which corresponds to a change between the diagnostic states, the at least one characteristic value tuple is mapped onto a corresponding scalar value unique to a limit potential associated with the change between the diagnostic states.

18. The monitoring method according to claim 17, wherein a diagnostic partition is assigned a plurality of potentials with sub-partitions lying in between, wherein a potential is assigned uniquely to a predefined scalar value and in the presence of at least one characteristic value tuple which specifies a change between the sub-partitions, the at least one characteristic value tuple is mapped to the corresponding scalar value unique to the change between the sub-partitions.

19. The monitoring method according to claim 15, further comprising providing a plurality of interpolation functions and selecting the at least one interpolation function as a function of the characteristic value tuple, wherein the interpolation functions are assigned to the different diagnostic partitions, and in the presence of at least one characteristic value tuple which lies within one diagnostic partition of the diagnostic partitions, mapping the at least one characteristic value tuple to a unique scalar value by the interpolation function assigned to the one diagnostic partition.

20. The monitoring method according to claim 19, wherein a plurality of potentials are assigned to a respective diagnostic partition with sub-partitions in between, wherein the interpolation functions are assigned to different sub-partitions, wherein in the presence of at least one characteristic value tuple which lies within one sub-partition of the sub-partitions, the at least one characteristic value tuple is mapped to the unique scalar value by the interpolation function assigned to the one sub-partition.

* * * * *

UNITED STATES PATENT AND TRADEMARK OFFICE
CERTIFICATE OF CORRECTION

Page 1 of 1

PATENT NO. : 11,906,956 B2
APPLICATION NO. : 17/877645
DATED : February 20, 2024
INVENTOR(S) : Dietrich Brunn et al.

It is certified that error appears in the above-identified patent and that said Letters Patent is hereby corrected as shown below:

In the Claims

Column 10, Claim 1, Line 39:
"storage unity" should read: -- storage unit --.

Signed and Sealed this
Tenth Day of June, 2025

Coke Morgan Stewart
*Acting Director of the United States Patent and Trademark Office*